Patented May 4, 1948

2,441,063

UNITED STATES PATENT OFFICE 2,441,063

SALTS OF ALKYLOLAMINE BORIC ESTERS

Henry H. Gilmann, Philadelphia, Pa., assignor to Quaker Chemical Products Corporation, Conshohocken, Pa., a corporation of Pennsylvania No Drawing. Application June 4, 1943, Serial No. 489,683

13 Claims. (Cl. 260—404)

The present invention relates to new chemical compounds, and to methods of producing the same, and more particularly it relates to the preparation of novel chemical compounds of advantageous properties, applicable for use in the various industries. The present invention also relates to superior wetting and detergent compositions containing one or more of the novel chemical compounds of the invention as an active ingredient.

One object of the present invention is to provide a new type of chemical compound possessing properties making it especially advantageous for use in various applications in the industries.

Another object is to provide a simple and economical process for the preparation of a technically valuable compound from inexpensive raw materials.

Still another object of the invention is to provide a composition containing, an as active ingredient, one or more of the new chemical compounds of the invention, which composition is adapted for use as a detergent, wetting agent, emulsifier, textile assistant, dispersing agent, and the like.

Other objects will be apparent from a consideration of the specification and claims.

The present invention provides a new class of chemical compounds in the preparation of which at least one hydroxyl group of an alkylolamine is reacted so as to form a bond to at least one oxygen atom in a borating agent to form a boric ester of the alkylolamine, and the resulting product is converted into a salt by reaction of the amine base with an acid having at least four carbon atoms. The resulting product has many uses in the industrial field; for example, the compounds of the invention possess specific and unpredictably potent surface action properties, exhibiting excellent emulsifying, dispersing, and detergent qualities. By the invention, chemical compounds may be prepared which surpass in these properties any of the compounds of a related general nature previously known, such as the long chain fatty acid salts of non-borated alkylolamines, the boric esters of long chain acid amido compounds, the alkylolamine salts of sulphonated compounds, the anionic boric acid ester compounds of amino alcohols, and the like.

In accordance with the present invention, an alkylolamine and a borating agent are reacted to provide a boric ester of the alkylolamine, and a salt of the boric ester is formed by reaction of the ester with an acid having at least four carbon atoms. In the latter reaction, in the terms of the classical valence theory, the nitrogen of the amino group of the alkylolamine becomes penta-valent and the acid nucleus (R·COO—) and a hydrogen atom become attached to the nitrogen atom. In preparing the product of the present invention, the boric ester of the alkylolamine may be formed prior to the treatment of the ester with the acid, or the acid may be present with the alkylolamine and borating agent at the time the boric ester of the alkylolamine is formed, but in such case the temperature of the reaction should not be sufficient to cause any significant esterification or amidation between the alkylolamine and the acid. The product of the present invention is designated herein as a salt of an alkylolamine boric ester and an acid having at least four carbon atoms.

The products of the invention may vary widely in structure since various boric esters of the alkylolamine, and their corresponding salts, may be formed. Thus, in the case of a tertiary amine, the following formulae represent the simple boric esters that may be formed when boric acid or boric oxide is employed as the borating agent:

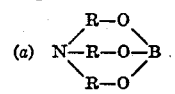

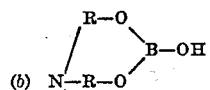

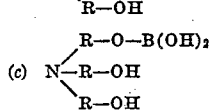

In the case of secondary amines, the following formulae represent the simple boric esters:

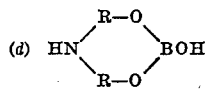

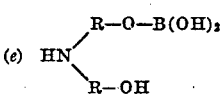

In the case of primary amines, the formula of the simple boric ester is:

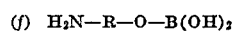

In the above formulae, R represents an alkyl group in which further substitution of the hydrogens may or may not have taken place. It is understood, of course, that in formulae d to f, the hydrogen attached to the nitrogen atom may be replaced by alkyl or other groups.

When a mono- or di-substituted boric acid is used as the borating agent, the types of simple esters which may be formed are dependent upon the number of OH groups of the substituted boric acid available for reaction with the esterifiable hydroxyl groups of the alkylolamine.

The number of boric esters (and consequently the number of salts) which may be formed in accordance with the invention is further greatly increased by reason of the fact that free esterifiable groups of the alkylolamine nucleus of the boric ester may combine with further molecules of the borating agent, which compound in turn may be esterified through any remaining OH groups with additional molecules of the alkylolamine. Likewise, any free OH groups of the borate radical of the boric ester may be reacted with esterifiable hydroxyl groups of further molecules of the alkylolamine, and any free hydroxyl groups of the resulting product may be further borated. In addition, molecules of the boric ester may combine by reaction of the hydroxyl group or groups of the alkylolamine nucleus of one molecule with the OH group or groups of the borate radical of another molecule. Thus, an endless multiplicity of the bonding variations are possible, and esters of relatively complicated structures may be formed.

Since the alkylolamines contain at least one esterifiable hydroxyl group and an amino nitrogen atom capable of reaction with an acid to form a salt, any of the members of this class of compounds may be employed in preparing the product of the invention. Thus, the alkylolamine may be an aromatic alkylolamine, a hydroaromatic alkylolamine, or an aliphatic alkylolamine, either of the straight chain or the cyclic (alicyclic) type. Of these, the use of an aromatic alkylolamine or a straight chain aliphatic alkylolamine is preferred. Furthermore, the alkylolamine may be a primary, secondary, or a tertiary amine. Mixtures of two or more alkylolamines may also be used.

Examples of alkylolamines which may be used in the present invention are: phenyl diethanol amine; 6 methyl naphthyl ethanol amyl amine; phenyl ethanol amine; toluyl methyl ethanol amine; 3 methoxy phenyl diethanol amine; cyclohexyl methyl ethanol amine; dihydro benzyl diethanol amine; tri-isopropanol amine; triethanol amine; diethyl ethanol amine; ethyldiethanol amine; amyl dioctanol amine; trimethylol amino-methane; mono-ethanol amine; 1 phenyl-1 naphthyl-2-aminoethanol; 1-phenyl-1 biphenyl-2-amino ethanol; 2-amino-2-ethyl-1, 3-propanediol; 1, 1-diphenyl-2-amino butanol; 2-amino-2-methyl-1-propanol; glucose amine; glycerol amine; 2-amino-1-pentanol; hydroxyethyl ethylene diamine; 3-ethoxy-1-amino-2-hydroxy butane; 7-amino-2-octanol; diglycerol amine; di-isopropanol amine; 2-amino-1, 3-propanediol; ethyl ethanol amine; diethanol amine; butyl ethanol amine; tetrahydro benzyl ethanol amine; sorbitol amine; 2-amino-2-methyl-1, 3-propanediol; and methyl diethanol amine.

The borating agent may be any boron compound capable of reacting with the hydroxyl group or groups of the alkylolamine to form a boric ester, for example, boric acid, boric oxide or a halogen boron compound, or a mono- or disubstituted boric acid, such as an aryl, alkyl, or aralkyl boric acid of the type of monocyclohexyl boric acid, benzyl and dibenzyl boric acid, and ethyl, propyl, and butyl boric acid.

The acid employed in the production of the product of the invention may be any acid having at least eight carbon atoms. Generally, the acid will not contain more than twenty-two carbon atoms. As previously stated, the acid reacts with the boric acid ester of the alkylolamine to form a salt in which one of the valences of penta-valent nitrogen is satisfied by the acid nucleus, while the other valence is satisfied by the hydrogen of the acid. The acid may be an aromatic, aliphatic, or alicyclic acid, and may, if desired, contain an inorganic nucleus. Substituted acids, such as the hydroxy, ketonic, chlorinated, amino, oxy, nitro and like acids of aromatic, aliphatic or alicyclic radicals may also be used. Preferably, the acid is one whose water-soluble alkali metal salts are surface tension depressants in aqueous solution, which property may be readily determined either by contact angle measurement or by the well known Draves test.

Of the acids available for use, a straight chain aliphatic acid, having at least eight carbon atoms (which may or may not be sulphonated), or an aromatic sulphonic acid is preferred. A polybasic acid ester having at least one free carboxyl group available for reaction is included herein in the term "acid." A mixture of two or more acids may be used. In place of employing relatively pure acids, the acids present in or obtained from vegetable, fish or animal oils, for example tallow, red oil, corn oil, soya bean oil, cottonseed oil, cocoanut oil, talloil, and the like, may be used.

Examples of acids that are applicable and may be used to form the product of the present invention are: the naphthalene sulphonic acids, and alkyl substituted naphthalene sulphonic acids (e. g. propyl naphthalene sulphonic acids and di-amyl naphthalene sulphonic acids); phenol sulphonic acids, sulphonated ricinoleic acid, sulphonated undecylenic acid, sulphonated cottonseed fatty acids, p-toluene sulphonic acid, sulphonated dioctyl succinate and the like; long chain fatty acids such as capric, lauric, palmitic, oleic, ethyl hexoic, myristic, stearic, melissic, dehydro stearic, ricinoleic acid, and the like; oxy or oxo acids such as levulinic acid, gluconic acid, dihydroxy stearic acid, hydroxy isobutyric acid, mandelic acid and the like; acid esters of polybasic acids, such as mono-oleyl adipate, and the like; abietic acid, naphthenic acids, trichlorobutyric acid, chloro phenyl stearic acid, mono-octyl phosphoric acid; quinaldine carboxylic acid, and other surface active acid radicals.

Generally, it is advantageous to use the borating agent in a quantity sufficient stoichiometrically to esterify all of the hydroxyl groups present in the alkylolamine and to use the acid in an amount sufficient stoichiometrically to react with all of the tri-valent amino-nitrogen available for reaction. However, as stated above, the invention includes compositions having free hydroxyl groups attached either to the boron atom or present in the alkylol group, and compositions which contain compounds having amino-nitrogen groups which have not been converted to the salt are also within the invention, so that large variations in the proportions of the ingredients employed are permissible. Thus, the alkylolamine or the borating agent or the acid may be in excess of that stoichiometrically required for reaction.

According to the invention, the alkylolamine and borating agent are reacted to form the boric ester. The conditions of this reaction are not critical and any temperature within a wide range up to the point of thermal decomposition of the product may be employed. Generally, it will be advantageous to employ a temperature sufficiently high to insure completion of the reaction within a reasonable period of time. The temperature employed in most instances will be between about 50° C. and about 200° C. In general, as the temperature of the reaction increases, the more rapidly will the reaction take place, but the resulting product may be somewhat dark in color. Usually, a temperature between about 100° C. and 150° C. is used. Advantageously, the reaction is conducted at a temperature above the boiling point of water at the pressure employed, and the reaction mixture may be heated in any desired manner, for example, by external heating, or by the passage therethrough of preheated air, steam or some inert gas. Completion of the reaction is indicated by the liberation of the theoretical amount of water. As stated before, the acid may be mixed with the alkylolamine and the borating agent prior to the formation of the boric ester; or the acid and the borating agent may be mixed together prior to mixing the alkylolamine therewith, or the alkylolamine and the acid may be reacted to form the amine salt of the alkylolamine and the salt may then be borated to form the product of the invention. These procedures have no advantages over the preferred process which involves the addition of the acid to the boric ester after its formation, and generally the alternative procedures lead to a slightly darker product. The claims, which recite that the alkylolamine, the borating agent, and the acid are reacted to form a salt of the boric ester of said alkylolamine and said acid are generic to the various processes and include the alternative procedures as well as the preferred procedure. In the case the boric ester is formed before the addition of the acid, the mixture may be cooled prior to adding the acid, since the reaction of the acid and the boric ester to form the salt takes place readily and an elevated temperature is not required to hasten the reaction.

The reaction is advantageously conducted at atmospheric pressure, but if desired sub- or super-atmospheric pressures may be used, for example, from a few millimeters vacuum to several atmospheres pressure. The use of a vacuum tends to accelerate the reaction, and super-atmospheric pressure may be beneficial in special instances. During the reaction, the mixture is advantageously agitated to insure intimate contact between the reactants, and the use of finely divided boric acid is recommended. A solvent or diluent such as water or an organic liquid, for example, xylene, cyclohexanol and the like, may be present, if desired, at the time of the reaction. Esterification catalysts may be present during the formation of the boric ester, but generally the reaction will take place readily without such auxiliary agents.

The following specific examples will serve to illustrate further the products of the present invention and the methods by which they may be prepared, the parts being by weight unless otherwise stated:

Example I 31 parts of triethanol amine and 12 parts of boric acid were heated one-half to one hour at 100° C.–120° C. in an open steam-jacketed kettle with agitation. After this period, 57 parts of oleic acid were added, and agitation continued for several minutes.

The product was found to possess detergent properties superior to any product heretofore commercially available. Similar products were prepared substituting other long chain fatty acids for oleic acid including caproic, caprylic, palmytic, undecanoic, stearic, and lauric acids and combinations thereof.

The following products likewise were found to possess useful surface active properties:

Example II

| | Parts |
|---|---|
| Naphthenic acid | 58 |
| Diethanol amine | 22 |
| Boric acid | 8 |

The method of preparation was the same as that described in Example I, except that the reaction was carried out at a temperature of 200° C., at a pressure of 10 lbs. per square inch gauge pressure.

Example III

| | Parts |
|---|---|
| Talloil | 180 |
| Boric acid | 30 |
| Trienthanol amine | 75 |

The method of preparation was the same as that described in Example I, except that the reaction was carried out at 60° C., under 10 mm. vacuum until the theoretical amount of water was given off.

Example IV

| | Parts |
|---|---|
| Tallow fatty acids | 63.5 |
| Boric acid | 6.5 |
| 2-amino-2-methyl-1-propanol | 30.0 |

The boric acid and the amine were mixed and heated at 80° C.–90° C. with agitation until the theoretical amount of water was liberated. The fatty acids were then added.

Example V

| | Parts |
|---|---|
| Soya bean fatty acids | 62.0 |
| Ethyl diethanol amine | 13.5 |
| Ethanol amine | 13.5 |
| Boric acid | 11.0 |

The mode of intermixing the ingredients was the same as in Example IV, except that the temperature employed was 100° C.

Example VI

| | Parts |
|---|---|
| Red oil | 57 |
| Boric acid | 12 |
| Triethanol amine | 31 |

All of these ingredients were intermixed, and reacted at 100° C. with moderate agitation.

Example VII

| | Parts |
|---|---|
| Corn oil fatty acids | 64 |
| Boric acid | 5 |
| Phenyl ethanol amine | 31 |

The boric acid and corn oil fatty acids were milled together on a three-roller differential speed mill, then added to the amine, which was preheated to 120° C. and maintained at this temperature for one-half hour.

Example VIII

| | Parts |
|---|---|
| Red oil | 160 |
| Boric acid | 30 |
| Triethanol amine | 75 |

The boric acid (200 mesh) and triethanol amine were heated to 150° C. within five minutes and maintained there for twenty minutes after which period the red oil, cooled to 10° C., was added.

Example IX

| | Parts |
|---|---|
| Monocyclohexyl boric acid | 142 |
| Diethanol amine | 105 |
| Tallow fatty acids | 280 |

The monocyclohexyl boric acid and diethanol amine were heated together at 110° C. for five hours, following which the mixture was cooled to 30° C. The tallow fatty acids were then added with stirring.

Example X

| | Parts |
|---|---|
| Tallow fatty acids | 63.6 |
| Boric acid | 6.5 |
| 2-Amino-2-methyl-1-propanol | 30.0 |

The boric acid was added in three portions over twenty-minute intervals to the 2-amino-2-methyl-1-propanol maintained at 115° C. At the end of two hours, the tallow fatty acids were added with vigorous agitation.

Example XI

| | Parts |
|---|---|
| Dibenzyl boric acid | 242 |
| Diethanol amine | 105 |
| Cottonseed fatty acids | 280 |

The dibenzyl boric acid was added rapidly to the diethanol amine maintained at 120° C. After cooling, this mixture to 50° C., the cotton seed fatty acids were added.

Example XII

| | Parts |
|---|---|
| 75% Sulfonated cottonseed fatty acids | 48 |
| Boric acid | 8 |
| Diethanol amine | 22 |

The boric acid and diethanol were heated to 80° C. under 60 mm. pressure and without agitation. The sulphonated cottonseed fatty acids were then added slowly and the product stirred continuously at 80° C. for one-half hour at atmospheric pressure.

Example XIII

| | Parts |
|---|---|
| 75% Sulphonated red oil | 24 |
| Boric acid | 8 |
| Diethanol amine | 22 |

The boric acid and diethanol amine were heated to 100° C. while passing an air stream through the reaction mass. When the theoretical amount of water had been liberated, the sulphonated red oil was added with stirring.

Example XIV

| | Parts |
|---|---|
| Mono-octyl phosphoric acid | 42 |
| Boric acid | 8 |
| Diethanol amine | 22 |

The finely pulverized boric acid (200 mesh) was added slowly over a period of thirty minutes to the diethanol amine and octyl phosphoric acid maintained at 125° C. Heating was continued until the theoretical amount of water was liberated.

Example XV

| | Parts |
|---|---|
| Naphthenic acids | 58 |
| Boric acid | 8 |
| Diethanol amine | 22 |

Air, preheated to 96° C. was passed through the mixture of boric acid and diethanol amine until the theoretical quantity of water was produced. The naphthenic acids were added after the product had been cooled to 50° C.

Example XVI

| | Parts |
|---|---|
| Tri-chlorobutyric acid | 76 |
| Boric acid | 8 |
| Diethyl ethanol amine | 53 |

Superheated steam was passed through the agitated mixture of boric acid and diethyl ethanol amine for a period of one hour. After allowing this product to cool, the tri-chlorobutyric acid was added with stirring.

Example XVII

| | Parts |
|---|---|
| Amyl naphthalene sulphonic acid (50%) | 110 |
| Boric acid | 8 |
| Diethanol amine | 22 |

The boric acid and diethanol amine were refluxed in 50 parts xylene. When the theoretical quantity of water had been liberated, the solvent was removed under vacuo and the alkyl naphthalene sulphonic acid was added with stirring.

Example XVIII

| | Parts |
|---|---|
| Phenol sulphonic acid (80%) | 44 |
| Boric acid | 8 |
| Diethanol amine | 22 |

Air, preheated to 1250° C. was passed through a mixture of phenol sulphonic acid, boric acid, and diethanol amine until the theoretical quantity of water had been liberated.

Example XIX

| | Pounds |
|---|---|
| Diethanol amine | 105 |
| Boric anhydride | 11 |
| Red oil | 270 |

The diethanol amine and boric anhydride were heated to 210° C. and the heating was continued until the theoretical amount of water was liberated. The mixture is cooled to 50° C. and the red oil added with stirring.

Example XX

| | Parts |
|---|---|
| An oxidized petroleum fatty acid product known to the trade as "Alox 400" | 80 |
| Boric acid | 16 |
| Diethanol amine | 44 |

This product was prepared as described in Example I.

Example XXI

| | Parts |
|---|---|
| Stearic acid | 280 |
| Boric acid | 20 |
| Butyl ethanol amine | 117 |

The stearic acid, boric acid, and butyl ethanol amine were heated to 50° C. at 5 mm. pressure until the theoretical quantity of water had been liberated.

Example XXII

| | Parts |
|---|---|
| Cocoanut oil fatty acids | 53.8 |
| Ethyl diethanol amine | 34.2 |
| Boric acid | 12.0 |

The boric acid is added to the product obtained by mixing the fatty acid and the alkylolamine.

This mixture is then heated to 110° C. and stirred until the boric acid has completely dissolved.

Example XXIII

|  | Parts |
|---|---|
| Hydroxy ethyl ethylene diamine | 52 |
| Boric acid | 10 |
| Corn oil fatty acids | 150 |

The boric acid and alkylolamine were heated to 160° C. in an autoclave at 2 atmospheres pressure. After one hour, the product was removed and reacted at 60° C. with the corn oil fatty acids.

Example XXIV

|  | Parts |
|---|---|
| $B_2O_3$ | 21 |
| Cyclohexanol | 60 |
| Diethanol amine | 63 |
| Water | 16 |

The above ingredients were mixed, agitated, and heated to 130° C. until the water added and the theoretical quantity of water of reaction were evolved. 170 parts of linseed oil fatty acids were then added with agitation.

As previously stated, the products of the invention either alone or in admixture with previously known treating or processing agents may be used in various industrial fields. They may be useful whenever wetting, detergent or emulsifying properties or other surface action modifying properties are required or desirable. For example, they are excellent detergents, and may be used without admixture with other materials or they may be mixed with various types of soaps, sulphonated soaps or oils, wetting agents, water-softening materials, alkalies, and the like. They may constitute the major portion of an admixture, for example, 50% to 90% or more, or they may be present in only a minor proportion, for instance, 40% to 5% or less. Where only a moderate increase in the efficacy of soaps is required, as little as 1% or even ¼% or 1/10% or less of one of the products of the present invention may be employed. Obviously, two or more of the products may be used in admixture. In addition to their utility as detergents, the products of the reaction are useful alone or in conjunction with other substances, for example, in the processing of fibrous materials involving fulling, sizing, de-sizing, impregnating, mordanting, delustering, or lustering, degumming, kier boiling, scouring, felting, oiling or lubricating, weighting and loading, dyeing including the printing processes and the pigment dispersions known as printing pastes, or in leather dyeing or tanning and in flotation processes including minerals or oils and the like.

Illustrative examples of superior wetting and detergent compositions containing, as a principal active ingredient, one of the products of the invention, are as follows:

Example A

|  | Per cent |
|---|---|
| Product of Example I | 80 |
| Sodium dioctyl sulpho succinate | 20 |

Example B

|  | Per cent |
|---|---|
| Product of Example III | 60 |
| Sodium meta silicate | 10 |
| Tetra potassium pyrophosphate | 20 |
| Sodium lauryl sulphate | 10 |

An important embodiment particularly contemplated is the use of the product in the laundering of textile materials, in which the product of the invention is used either as such or in conjunction with water softeners or alkalies and soaps or to increase and/or augment and/or potentiate the efficacy of soaps or soap solutions. This application is illustrated by the following examples:

Example C

Soiled cotton cloth was introduced in a water solution of ¼% of the product of Example I, ⅛% of soda ash, and 3% of chips of ordinary commercial soda soap.

It was revolved one-half hour in a commercial laundry wheel then rinsed in warm water. The cleaning was highly satisfactory and proved much superior to what would have been achieved with the other ingredients alone, in the absence of the product of this invention.

Example D

|  | Per cent |
|---|---|
| Olive oil soap (67% solids) | 80 |
| Product of Example I | 20 |

Four parts of this mixture in 96 parts of water exhibits an emulsification, dispersion, and detergency superior to that of soap alone and is capable of effectively removing stains, which are resistant to soap alone.

Example E

|  | Per cent |
|---|---|
| Cottonseed soap (80% solids) | 80 |
| Product of Example IV | 20 |

A 4% aqueous solution of this mixture shows a marked improvement in detergency over a similar solution of soap alone. Palm oil soaps admixed with the products of this invention possess greater detergency than such soap used alone.

Example F

|  | Per cent |
|---|---|
| Product of Example I | 13.3 |
| Tetra sodium pyrophosphate | 33.3 |
| Borax | 33.3 |
| Soda ash | 13.3 |
| Sulphonated amyl naphthalene | 6.8 |
|  | 100.0 |

The above ingredients are mixed to form a uniform, dry powdered product. Such a product is an excellent powdered detergent.

Example G

|  | Per cent |
|---|---|
| Potassium oleate | 45 |
| Kerosene | 5 |
| Water | 30 |
| Product of Example III | 20 |

The above mixture exhibits emulsifying, foaming, and scouring action superior to that of potassium oleate soaps used alone.

Example H

|  | Per cent |
|---|---|
| A talloil mixed alkali soap (70% solids) | 60 |
| Product of Example I | 40 |

The above mixture exhibits detergency superior to that of the soap employed, when used alone.

Example I

|  | Per cent |
|---|---|
| Talloil mixed alkali soap (55% solids) | 75 |
| Product of Example XXI | 25 |

The mixture exhibited detergency superior to that of the soap employed, when used alone.

As is clear from the foregoing, considerable latitude may be exercised in the choice of the alkylolamine, the borating agent and the acid, and considerable modification is possible in the conditions of the reaction, as well as in the uses of the product of the invention, without departing from the essential features thereof.

I claim:

1. As a new product, a salt of an alkylolamine boric ester and an organic acid having from 8 to 22 carbon atoms selected from the group consisting of aliphatic, alicyclic, and aromatic acids, in which an alkylol group of the alkylolamine forms a bond through oxygen between the alkylene portion of the alkylol group and a boron atom, and in which a salt has been formed between an amino-nitrogen group and the acid nucleus.

2. The product of claim 1 wherein all of the hydroxyl groups of the alkylolamine are esterified; and wherein all amino-nitrogen groups in the compound are converted into salts of said acid.

3. As a new product, a salt of an alkylolamine boric ester and an aliphatic carboxylic acid having from 8 to 22 carbon atoms, in which an alkylol group of the alkylolamine forms a bond through oxygen between the alkylene portion of the alkylol group and a boron atom, and in which a salt has been formed between an amino-nitrogen group and the carboxylic acid nucleus.

4. As a new product, a salt of an aliphatic alkylolamine boric ester and an aliphatic carboxylic acid having from 8 to 22 carbon atoms, in which an alkylol group of the alkylolamine forms a bond through oxygen between the alkylene portion of the alkylol group and a boron atom, and in which a salt has been formed between an amino-nitrogen group and the carboxylic acid nucleus.

5. The product of claim 4 wherein all the hydroxyl groups of the alkylolamine are esterified; and wherein all amino-nitrogen groups in the compound are converted into salts of said acid.

6. As a new product, a salt of an aliphatic alkylolamine boric ester and a straight chain aliphatic carboxylic acid having from 8 to 22 carbon atoms, in which an alkylol group of the alkylolamine forms a bond through oxygen between the alkylene portion of the alkylol group and a boron atom, and in which a salt has been formed between an amino-nitrogen group and the carboxylic acid nucleus.

7. As a new product, a salt of an alkylolamine boric ester and a sulphonated aliphatic carboxylic acid having from 8 to 22 carbon atoms, in which an alkylol group of the alkylolamine forms a bond through oxygen between the alkylene portion of the alkylol group and a boron atom, and in which a salt has been formed between an amino-nitrogen group and the carboxylic acid nucleus.

8. As a new product, a salt of an aliphatic alkylolamine boric ester and a sulphonated aliphatic carboxylic acid having from 8 to 22 carbon atoms, in which an alkylol group of the alkylolamine forms a bond through oxygen between the alkylene portion of the alkylol group and a boron atom, and in which a salt has been formed between an amino-nitrogen group and the carboxylic acid nucleus.

9. The product of claim 8, wherein all the hydroxyl groups of the alkylolamine are esterified; and wherein all amino-nitrogen groups in the compound are converted into salts of said acid.

10. As a new product, a salt of an aliphatic alkylolamine boric ester and a sulphonated straight chain aliphatic carboxylic acid having from 8 to 22 carbon atoms, in which an alkylol group of the alkylolamine forms a bond through oxygen between the alkylene portion of the alkylol group and a boron atom, and in which a salt has been formed between an amino-nitrogen group and the carboxylic acid nucleus.

11. As a new product, a salt of an alkylolamine boric ester and a naphthenic acid having from 8 to 22 carbon atoms, in which an alkylol group of the alkylolamine forms a bond through oxygen between the alkylene portion of the alkylol group and a boron atom, and in which a salt has been formed between an amino-nitrogen group and the acid nucleus.

12. The product of claim 11, wherein all the hydroxyl groups of the alkylolamine are esterified; and wherein all amino-nitrogen groups in the compound are converted into salts of said acid.

13. As a new product, a salt of an aliphatic alkylolamine boric ester and a naphthenic acid having from 8 to 22 carbon atoms, in which an alkylol group of the alkylolamine forms a bond through oxygen between the alkylene portion of the alkylol group and a boron atom, and in which a salt has been formed between an amino-nitrogen group and the acid nucleus.

HENRY H. GILMANN.

REFERENCES CITED

The following references are of record in the file of this patent:

UNITED STATES PATENTS

| Number | Name | Date |
|---|---|---|
| 1,935,217 | Ulrich et al. | Nov. 14, 1933 |
| 2,052,192 | Piggott | Aug. 25, 1936 |
| 2,055,581 | Leben | Sept. 29, 1936 |
| 2,216,617 | Katz | Oct. 1, 1940 |
| 2,216,618 | Katz | Oct. 1, 1940 |
| 2,237,629 | Orelup | Apr. 9, 1941 |